United States Patent
Balijepalli et al.

(10) Patent No.: US 10,223,541 B2
(45) Date of Patent: Mar. 5, 2019

(54) ADAPTIVE PERMISSION TOKEN

(71) Applicant: salesforce.com, inc., San Francisco, CA (US)

(72) Inventors: Harish Balijepalli, San Ramon, CA (US); Ryan Michael Michela, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 207 days.

(21) Appl. No.: 15/414,605

(22) Filed: Jan. 24, 2017

(65) Prior Publication Data
US 2018/0211055 A1 Jul. 26, 2018

(51) Int. Cl.
| | |
|---|---|
| *H04L 29/06* | (2006.01) |
| *G06F 21/62* | (2013.01) |
| *G06F 21/31* | (2013.01) |
| *H04L 9/08* | (2006.01) |
| *G06F 21/33* | (2013.01) |
| *G06Q 50/26* | (2012.01) |
| *G06F 21/60* | (2013.01) |

(52) U.S. Cl.
CPC .......... *G06F 21/6218* (2013.01); *G06F 21/31* (2013.01); *G06F 21/335* (2013.01); *H04L 9/0819* (2013.01); *G06F 21/602* (2013.01); *G06Q 50/26* (2013.01); *H04L 63/166* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 6,339,423 B1* | 1/2002 | Sampson | ........... | G05B 19/0425 709/219 |
| 7,028,090 B2* | 4/2006 | McBrearty | .......... | G06F 21/6218 709/229 |
| 7,337,327 B1* | 2/2008 | Sallam | .................. | G06F 21/554 713/189 |
| 8,042,163 B1* | 10/2011 | Karr | ........................ | G06F 3/062 713/164 |
| 8,793,509 B1* | 7/2014 | Nelson | .................. | G06F 21/335 380/227 |

(Continued)

OTHER PUBLICATIONS

M. Jones, et al., "JSON Web Token (JWT)," Internet Engineering Task Force (IETF), NRI May 2015, https://tools.ietf.org/html/rfc7519, 31 pages.

*Primary Examiner* — Shin-Hon (Eric) Chen
(74) *Attorney, Agent, or Firm* — Meyertons, Hood, Kivlin, Kowert & Goetzel, P.C.

(57) ABSTRACT

Techniques are disclosed relating to generating permission tokens. A first computer system may store permission information for a user that indicates a plurality of permissions for the user for accessing data within a database system. The first computer system may receive, from a user device, a permission request for permissions to perform actions at a second computer system. In response to authenticating the user, the first computer system may create a token with one or more permissions for the user by selecting the one or more permissions from the plurality of permissions stored for the user such that the created token does not exceed a specified size and may provide the token to the user device.

8 Claims, 12 Drawing Sheets

(56) References Cited

U.S. PATENT DOCUMENTS

| | | | |
|---|---|---|---|
| 8,838,501 B1* | 9/2014 | Priebatsch | G06Q 20/40 705/26.41 |
| 9,213,660 B2 | 12/2015 | Salisbury et al. | |
| 9,473,304 B1 | 10/2016 | Dixon et al. | |
| 2002/0099952 A1* | 7/2002 | Lambert | G06F 21/51 726/27 |
| 2004/0122877 A1 | 6/2004 | Nakayama | |
| 2011/0225643 A1* | 9/2011 | Faynberg | G06F 21/31 726/10 |
| 2011/0283111 A1* | 11/2011 | Bister | G06F 21/10 713/185 |
| 2013/0044745 A1* | 2/2013 | Imamura | H04L 47/215 370/351 |
| 2014/0020064 A1* | 1/2014 | Hildebrand | G06F 21/335 726/4 |
| 2014/0136419 A1 | 5/2014 | Kiyohara | |
| 2014/0282884 A1* | 9/2014 | Bao | G06F 21/31 726/4 |
| 2015/0150109 A1 | 5/2015 | Bocanegra et al. | |
| 2015/0341346 A1* | 11/2015 | Novak | H04L 63/0853 726/9 |
| 2016/0232527 A1* | 8/2016 | Patterson | G06Q 20/405 |
| 2017/0034172 A1* | 2/2017 | Biggs | H04L 63/08 |
| 2018/0082284 A1* | 3/2018 | Gomes | G06Q 20/36 |

* cited by examiner

ADAPTIVE PERMISSION TOKEN

BACKGROUND

Technical Field

This disclosure relates generally to computer systems, and, more specifically, to systems that utilize tokens that indicate permissions for a user.

Description of the Related Art

Data systems frequently allow users to access a variety of different types of data. Database systems, for example, may be designed to store information for individuals, groups, companies, governments, and the like. Such systems may enforce permissions that indicate who can create, view, modify, save, and delete certain information. As just one example, a database system may enforce a user's access to government records based on that user's security clearance. Systems today may allow users to have a large number of permissions, however. For example, it is common for a user of a database system to have thousands of different permissions within the database.

Figure 1:
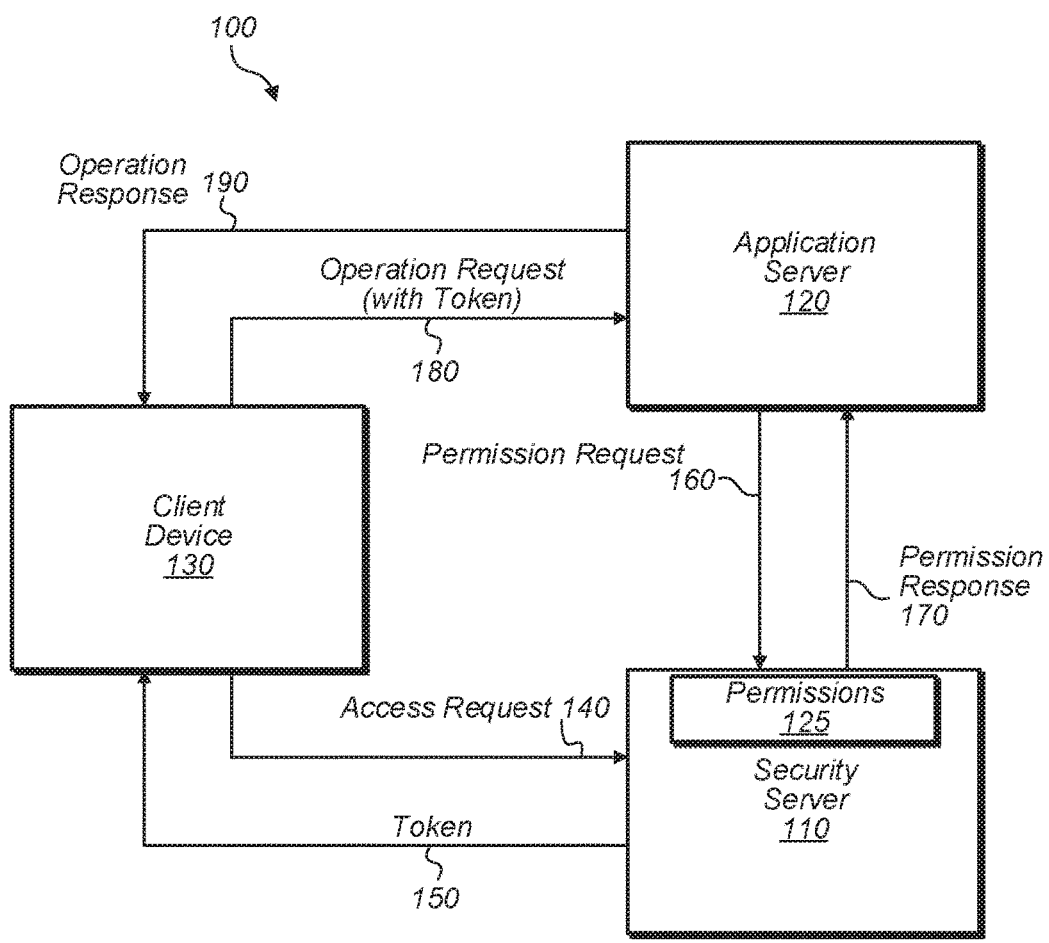
FIG. 1 is a block diagram illustrating exemplary elements of a system that facilitate operation requests that include tokens, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated (e.g., no electrical power is currently being supplied to it). Thus, an entity described or recited as "configured to" perform some task refers to something physical, such as a device, circuit, memory storing program instructions executable to implement the task, etc. This phrase is not used herein to refer to something intangible.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a token having eight permissions, the terms "first" and "second" permissions can be used to refer to any two of the eight permissions. In other words, the "first" and "second" permissions are not limited, for example, to the first two permissions in a list of permissions associated with a token.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

When a client sends a request via a client device to a computer (e.g., a server computer) to perform some action, the computer typically needs to be able to evaluate whether the client has permission to perform that action. As used herein, a "permission" of a client refers to information that indicates whether that client may perform some action or actions on specified data. For example, a client may have read but not write access for a particular database. Different clients to whom the database is accessible may of course have different permissions, and thus perform different sets of actions.

A computer such as an application server (e.g., a computer system that implements one or more applications, such as a database program) that receives requests from different clients thus needs some way to determine a set of permissions associated with a particular client. The term "application server computer system" or "application server" is used generically herein to refer to a computer system that receives a request from a client to perform some operation. Such a request is referred to as "operation request" herein. In various embodiments, these permissions may be stored on a computer system that is separate from the computer system to which access is requested. As used herein, a computer on which such permission information is stored is referred to as a "security computer system" or "security server." When an application server receives many requests, potentially from thousands of different clients, it becomes impractical, however, to access the security computer system for each operation request. To alleviate this issue, a client may receive information that indicates the client's permissions. This information is referred to herein as a "token." A token may be arranged to any suitable format. This paradigm allows the client to present its token along with an operation request to an application server, which may then use the token to assess whether the client may perform the requested operation.

The present disclosure recognizes that as the number of individual permissions for a client becomes large, the token for that client becomes large as well. A token that stores 50 permissions will have a much smaller memory footprint than one that stores 500 or 5,000 permissions. Such may be the case, for example, with an extremely large database. Presenting a large memory footprint token with each request can thus become a significant drain on system bandwidth, and affect system latency. The present disclosure thus describes techniques for addressing these problems. In various embodiments, a token is created and updated such that it does not continually keep growing in size as the number of a client's permissions increases. In many instances, this means that a token has some maximum size. Thus, a token for a particular client may only store some subset (i.e., some but not all) of a total set of permissions for the client. In one implementation, for example, a token may be limited to storing at most some maximum number of client permissions (e.g., 50 permissions). The current subset of permissions at a given time may be selected in various manners. In some instances, the current permissions may be based on the most recent set of operations of the client, the most frequently requested operations. More generally, the current set of permissions for a particular client may be based on a profile of the client, behavior of the client, or any combination thereof. In this manner, the permissions most likely to be implicated by an operation request are stored in a token. These algorithms may be implemented by any suitable computer system. In embodiments described herein, a current subset of permissions is selected by a security server.

In various embodiments, when a client desires to perform several operations on data stored by an application server, the client presents a token to the application server with each request. Since the token may frequently include a limited amount of permissions, the client may be requesting an operation whose corresponding permission is not included in the token. In such situations, the application server may send a request to a security system for the requested missing permission. The request may include, for example, an identifier that indicates the client and the requested permission. The security system may responsively access the total set of permissions associated with the client and determine whether the client has the missing permission. Upon determining that the client has such permission, the security system may send a notification to the application server that indicates that the client has the missing permission. In various embodiments, the application server performs the requested operation in response to receiving the notification from the security system. The security system may also update information indicative of the behavior of the client (for example, the types of operations requested by the client), which may subsequently be used to generate an updated token for the client that includes an updated set of current permissions.

For example, in one implementation, a token may be limited to a few kilobytes in size. In such an implementation, after including signatures, encryption overhead, and the bloat caused by base64 encoding, there may be space in the token for only 30-50 permissions out of potentially thousands associated with a user. In such instances, a subset of permissions may need to be selected for inclusion in the token. Given this limited space, a token might include only a small percentage (e.g., one or two percent) of a total available set of permissions for any given user.

Accordingly, by implementing a token with a limited amount of permissions or some relatively small fixed size, a client may present the token with each request without consuming copious amounts of bandwidth. Implementing this type of token-based system may also reduce the communication between the application server and the security system, saving additional bandwidth. Further, since the token may not include all of the client's permissions, the application server may spend less time comparing all of the permissions in the token against the requested operation.

Turning now to FIG. 1, a block diagram of one embodiment of a system is shown that facilitates operation requests that include tokens. In the illustrated embodiment, security server 110, application server 120, and client device 130 are configured to exchange data with each other. For example, in various embodiments, client device 130 may initially send access request 140 to security server 110 and receive, in response, token 150 from security server 110 that includes a set of permissions that a client associated with client device 130 can perform with respect to data accessible via a computer such as application server 120. As shown, client device 130 may send operation request 180 that includes token 150 to application server 120, which may fulfill operation request 180 and send response 190 to client device 130. (In other embodiments, a token may be transmitted separately from the operation request.) Operation request 180 corresponds to some particular action or actions that are to be performed via application server 120. In one embodiment, when token 150 does not specify the one or more permissions needed to perform the action specified in the operation request, application server 120 may send permission request 160 to security server 110 and receive, in response, permission response 170. Permission response 170 will indicate whether the permission indicated in request 160 is permitted, and may, in some embodiments, take the form of a new token. Response 170 may also simply be an indication of whether the requested permission is allowed. In some embodiments, security server 110 stores permissions 125, which includes in some cases the total set of one or more permissions for clients of system 100 (e.g., each client who is permitted to access data via application server 120). In various embodiments, security server 110 and application server 120 may be implemented on a local computer system, or a computer system, such as a server, on a wide-area network, and may be cloud-based in some embodiments. Moreover, security server 110 and application server 120 may be implemented on the same computer system or separate computer systems. While security server 110 and application server 120 are each depicted as a single "box" in FIG. 1, in various embodiments, these servers may be implemented by a group of computers that may act in concert with one another.

Security server 110, in one embodiment, in addition to storing a set of permissions 125 for various clients, may also store additional information, such as a unique ID, verification information, and past behavior or usage for each client. The unique ID may constitute any form of identification that identifies a client, such as a username, an email, an account number, a group reference number, etc. In some embodiments, verification information may include an alphanumeric password, a security code, biometric identification information, and so on.

As shown, security server 110, in some embodiments, is configured to receive at least two types of requests: access request (e.g., 140) and permission request (e.g., 160). The former is a request for a token that includes permissions, as while the latter is a request to perform some action. An access request may, for example, constitute a login request. On the other hand, a permission request, as will be discussed further below, is a request from a system such as application server 120 to verify whether one or more actions not specified in the token supplied by a client as part of an operation request may be performed despite not being specifically identified by the provided token.

Access request 140, which may include a unique ID and verification information that associates a client using client device 130 with the unique ID, can be considered to be a direct request for a permission-specifying token from client device 130, and may result, in some instances, from a login request made by the client of client device 130. Thus, a login corresponding to access request 140 may be sent to security server 110 to retrieve a set of permissions (which may be encoded in a token) that indicate actions that the client may perform at a system that includes application server 120.

In response to access request 140, security server 110 may select all or a subset of permissions associated with a unique ID to be included in a token 150. In various embodiments, the size of token 150 is constrained—for example, to a maximum size that is much less than a size that would accommodate a total possible number of permissions for a client (e.g., the maximum size of a system variable). In such embodiments, security server 110 will typically need to select a subset of the permissions that are assigned to a client in order to fit the permissions within the maximum size of the token. Accordingly, security server 110 may store information indicative of a preferred or default subset of permissions and may replace permissions in the subset using any caching algorithm, including, but not limited to, least recently used (LRU), least-frequently used (LFU), or random replacement (RR). In some embodiments, security server 110 selects only permissions that have been requested by application server 120 more than some set number of times.

Furthermore, in some instances, security server 110 may update the information indicative of a subset of permission to include a permission included in a permission request (e.g., 160). Thus, where the number of permissions included in a token is less than the maximum number of possible permissions for a token and the client requests to perform an operation corresponding to a permission not in the currently provided token, the token may be updated to include the newly requested permission. In some embodiments, the subset of permissions may increase in size as requested permissions are added until the size reaches its maximum specified threshold. Accordingly, subsequent tokens 150 may include the requested permissions added in response to permission requests 160. In some embodiments, security server 110 may modify the information indicative of a subset of permissions to remove permissions from the subset of permissions. As an example, when a token has reached its maximum size, security server 110 may determine, in response to a permission request 160, that a particular permission needs to be included in the token. Thereafter, security server 110 may select a permission included in the token that a client has not needed in recent requests, and replace this selected permission with the particular requested permission.

In some embodiments, after receiving access request 140, security server 110 may verify the identity of the requesting client, create and encode token 150 with selected permissions. Security server 110 may also sign the token using an encryption key. Security server 110 may additionally securely transfer the encryption key to application server 120. In some embodiments, security server 110 and application server 120 may use a public and private encryption key pair to sign and verify token 150.

In some instances, security server 110 may encode token 150 with a time stamp. As used herein, a time stamp refers to data that indicates some time value associated with a token, particularly one that is usable to determine whether the token is currently valid. For example, in various embodiments, a time stamp may indicate the time of creation of a token, the time of expiration of a token, etc. In some cases, security server 110 may encode token 150 with a session identification (SID) that may be used by application server 120 to reject the token based on an indication from security server 110 that the token is invalid. That is, security server 110 may send an indication to server 120 that specifies an SID that has become invalid and thus server 120 may reject received tokens that are encoded with that SID.

Application server 120, in one embodiment, is configured to receive operation request 180 and token 150 from client device 130. As noted, an "operation request" is a request by a client to perform some action (e.g., access a particular portion of a database). In various embodiments, an operation request may either include a token such as token 150 or have such a token transmitted in addition to the request. Operation request 180 may specify one or more operations to be performed by application server 120 (on behalf of a client) such as opening, editing, creating, saving, transferring, and/or deleting data (e.g., applications, files, etc.) accessible via application server 120. In some instances, application server 120 may authenticate a signature and time stamp of token 150 to determine the origin of token 150 and whether token 150 has expired. For example, application server 120 may authenticate token 150 and determine that token 150 has expired based on a time of expiration indicated in the time stamp. In such a case, application server 120 may send response 190 to client device 130, which may inform client device 130 that token 150 has expired. Such a response may prompt client device 130 in some cases to retrieve a new token 150 from security server 110. In some cases, application server 120 may send a notification to security server 110 that indicates that an expired token has been presented to application server 120.

In various embodiments, application server 120 may receive a request from security server 110 to reject a particular token 150 that includes a specific session ID. For example, when security server 110 updates the subset of permissions included in token 150 in response to permission request 160, security server 110 may request that application server 120 reject requests from client device 130 that include previous tokens issued by security server 110 that do not have the updated subset. Accordingly, application server 120 may reject tokens having the indicated session ID. As another example, security server 110 may issue a particular token 150 that includes a permission for an employee of a company to edit a company document. Later, the company may remove the permission from the employee such that he or she cannot edit the document. Security server 110 may enforce this permission by instructing application server 120 to reject the particular token 150 based on a session ID encoded in said token.

Based on the type of action (e.g., opening, editing, etc.) and the data specified in operation request 180, application server 120 may extract the permissions from token 150, search the permissions for the type of action and the specified data, and determine, based on the extracted permissions, whether client device 130 has the authority to request the action specified in operation request 180. For example, in one scenario, application server 120 may receive a request to move an audio file from a first location to a second location. In response, application server 120 may extract a set of permissions from token 150 and determine if those permissions permit the audio file to be moved. In one possible case, application server 120 may find the needed permission and then move the file from the first location to the second location. On the other hand, application server 120 may find a "move" permission, but one that specifies a different audio file and thus send permission request 160 to security server 110 to verify whether the needed permission is allowed. Once it is determined whether or not the needed permission has been assigned to the client, application server 120 may send response 190, which indicates whether the action was performed, to client device 130.

In some cases, a set of permissions currently included in a token may not include a particular permission that is associated with the type of action and the data specified in operation request 180. In response, application server 120 may send a permission request 160 to security server 110 requesting the particular permission. Furthermore, application server 120 may store "permission miss information"—that is, information relating to a particular permission that has been requested by a client but which is not specified in the current token. Permission miss information may include, for example, the number of times this particular permission has missed (i.e., has not been supplied), the time of the miss, etc. In some embodiments, application server 120 may provide the permission miss information to security server 110, which may be used to determine the content of permissions for subsequent tokens to be issued. In response to permission request 160, application server 120 may receive an indication (e.g., permission response 170) as to whether the requested permission is to be allowed. This information may be in the form of a simple indication (a yes/no indication), an updated token, a new token, or the like.

In response to receiving permission response 170, application server 120 may analyze the information in the response and determine whether or not client device 130 has the particular permission. In a situation in which a permission is not indicated, application server 120 may notify (via operation response 190) client device 130 that application server 120 cannot perform the requested action because client device 130 does not have the necessary permission. In some embodiments, permission response 170 is a fresh token 150 that application server 120 may provide to client device 130.

Client device 130, in one embodiment, is operable to retrieve token 150 from security server 110 and submit operation request 180 and token 150 (which may be included in or accompany request 180) to application server 120. In some embodiments, client device 130 may perform a secure sockets layer (SSL) handshake or a transport layer security (TLS) handshake with security server 110 or application server 120 to exchange an encryption key for protecting further communication. After securing the connection, client device 130 may send access request 140, which may include a unique ID and verification information, to security server 110. Client device 130 may receive token 150 in response and submit operation request 180 and token 150 to application server 120. In some embodiments, client device 130 may receive operation response 190, which may indicate either a successful operation request 180 or a failed operation request 180 due to a lack of a particular permission.

Operation request 180 may include any of one or more suitable operations, including, but not limited to, edit, create, retrieve, transfer, delete, and so on. Generally, request 180 may refer to any operation that a client using client device 130 may wish application server 120 to perform on data, such as data stored by an application database. As an example, a client using client device 130 may want to open a Word document and update a footnote in the document. The client may send, via client device 130, a first operation request, which includes a set of instructions to open the Word document. The first operation request may either include or be accompanied by token 150. After application server 120 authenticates token 150 and determines that the client has the necessary permission, application server 120 may retrieve the Word document and cause the document to be displayed to the client via an interface. Thereafter, client device 130 may send a second operation request, which includes instructions to update the footnote, and token 150. Again, application server 120 may authenticate token 150, check for the necessary permissions, and, only afterwards, update the footnote and cause the update to be displayed to the client via the interface.

Figure 2:
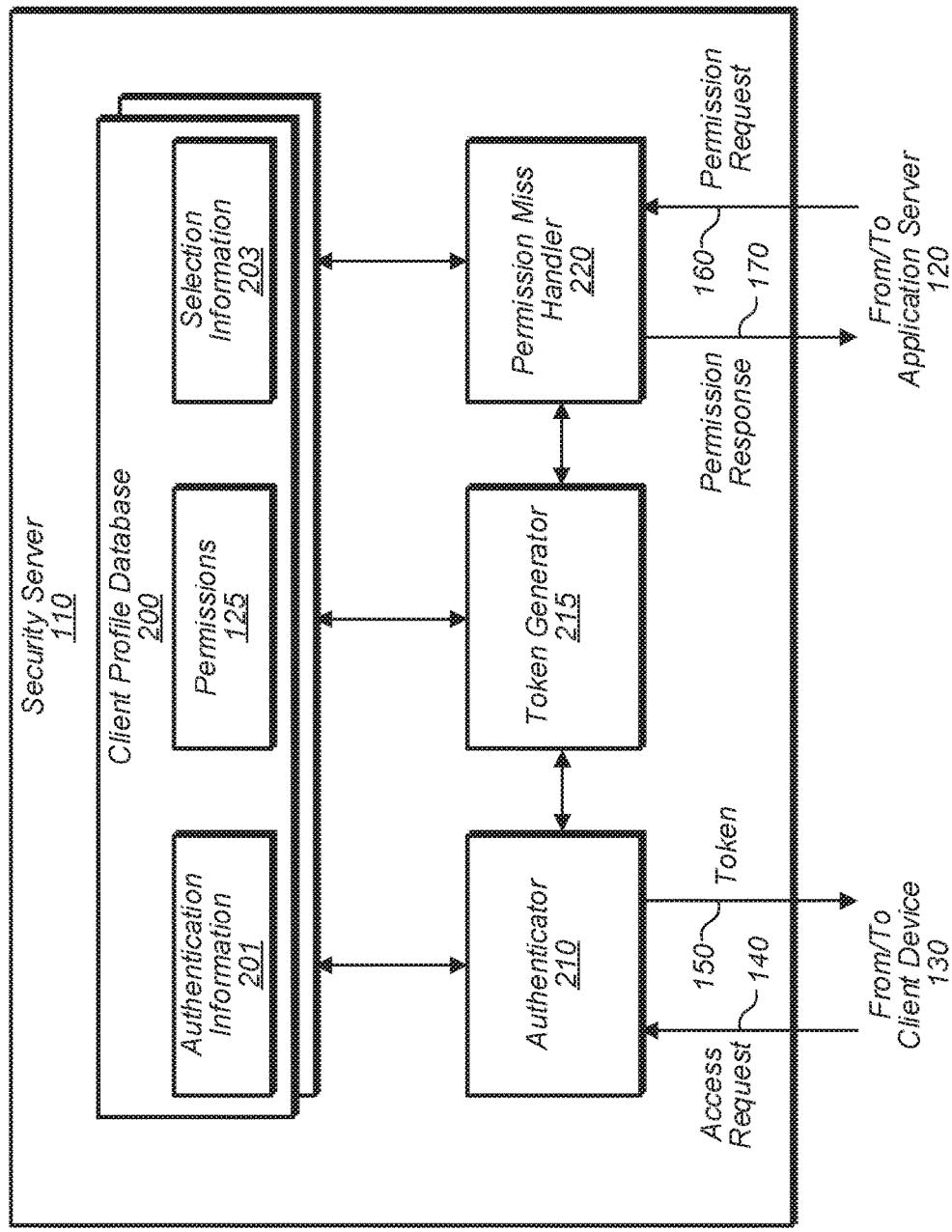
FIG. 2 is a block diagram illustrating exemplary elements of a security server that generate tokens, according to some embodiments.

Turning now to FIG. 2, a block diagram of one embodiment of security server 110 is depicted. In the illustrated embodiment, security server 110 includes various modules, including a client profile database 200, an authenticator 210, a token generator 215, and a permission miss handler 220. As used herein, a "module" may refer to either a set of one or more software routines for performing a function, hardware for performing the function, or a combination of hardware and software. As will be described below, security server 110 may receive access request 140 at authenticator 210 and permission request 160 at permission miss handler 220. In the illustrated embodiment, database 200 includes authentication information 201, permissions 125, and selection information 203.

Client profile database 200, in one embodiment, is configured to store information relating to clients of security server 110 and application server 120. In one embodiment, database 200 stores information for each client of a tenant (e.g., a group, a corporation, a government, etc.). Database 200 may receive requests for verification information, personal information, permissions, past client behavior, and/or predictions of future client behavior (e.g., permissions that are likely to be used in future requests by a client) from authenticator 210, token generator 215, and permission miss handler 220. Furthermore, database 200 may update stored information in response to receiving new or updated information from authenticator 210 or permission miss handler 220.

In several embodiments, database 200 may receive, from authenticator 210, a request for information to authenticate a client and, in response, provide authentication information 201 to authenticator 210. Database 200 may also receive requests, from token generator 215, for permissions and information defining a selection of those permissions stored at permissions 125 and selection information 203, respectively. After receiving the permissions and the information, token generator 215 may select and compile a subset of permissions based on the information. Accordingly, the information may indicate, for example, the most previously used permissions, the most missed permissions, most used permissions, and general habits of a particular client.

Authentication information 201, in one embodiment, stores a variety of information, including a unique ID, verification information, and other personal information about a client. The personal information may include a first name, a last name, an age, credit card information, preferences, etc. In some embodiments, database 200 may send authentication information 201 to authenticator 210 in response to a request from authenticator 210. As an example, authenticator 210 may send a request that includes a unique ID "j Smith" to database 200, which may use the unique ID to retrieve the corresponding profile "John Smith" from authentication information 201 and may send a stored hashed password, related to the profile, to authenticator 210. In several embodiments, authentication information 201 stores session IDs corresponding to tokens 150 issued to a client of client device 130. As discussed above, these session IDs may be used by application server 120 to reject tokens that have been encoded with said session IDs. Various other security schemes are of course possible.

Permissions 125, in one embodiment, stores a totality of permissions indicative of actions that are currently permitted to be performed, on behalf of a client associated with client device 130, at application server 120. Initially, database 200 may receive these permissions (and new ones) from a client/tenant via a web interface (not shown) and store them within permissions 125. A tenant may also create new permissions or delete stored permissions for each of their clients. As an example, a business may create a set of permissions for a development team to view documents relating to a prototype, but not their sales team. Accordingly, a set of permissions for a first client may differ from those of a second client. For example, the first client may be able to open, edit, and delete a particular portion of a database while the second client may only open the particular portion.

In various embodiments disclosed herein, the totality of permissions 125 stored for a particular client may be used to select a subset of permissions for inclusion in a new or updated token. This subset may be determined in a variety of ways. In various embodiments, database 200 may receive a request, from token generator 215, for all of the permissions stored for a particular client. In response, database 200 may send the permissions and additional information (e.g., selection information 203) to token generator 215. In other embodiments, however, each permission of permissions 125 may be flagged with an indication as to whether it should be included in a token. That is, token generator 215 may not need to retrieve all the permissions stored at permissions 125, rather only the permissions indicated as needing to be included in a token. As such, in response to a request from token generator 215, database 200 may in some instances provide only the permissions that should be included in a token. In other embodiments, database 200 may only provide all permissions for a client, along with information that allows selection of a current set of permissions to be included in a token.

Selection information 203, in one embodiment, stores information indicative of past client behavior, which in turn may be used to select a subset of permissions. The information may include the most recently used permissions, the most missed permissions, the most used permissions, etc. In some embodiments, token generator 215 may use the information stored at selection information 203 to select a subset or all of permissions 125 for a particular client. In embodiments in which there are identifiers indicating whether a specific permission should be included in a token, handler 220 may also use the information stored at selection information 203 to update these identifiers. Handler may further update the information that is stored at information 203 in response to request 160. As an example, handler 220 may determine that a particular permission had not been included in a recent token (in response to request 160) and thus indicate to database 200 that the information relating to the number of times this permissions been requested should be updated to include the recent miss.

Authenticator 210, in one embodiment, is operable to authenticate a requesting client and provide, to said client, a token usable for operation requests 180. In some embodiments, authenticator 210 may receive a request (e.g., access request 140) encoded with a unique ID and verification information and, thereafter, extract the information from the request. For example, authenticator 210 may receive a particular access request 140 that specifies a unique ID, "jSmith," and verification information, "password123," that are usable to authenticate the requesting client. In response to receiving access request 140, authenticator 210 may retrieve authentication information 201 from database 200. In various embodiments, authenticator 210 may compare information 201 (e.g., username and password) with both the unique ID and the verification information in order to authenticate the requesting client. After a client has been authenticated, in some embodiments, authenticator 210 sends a request to token generator 215 for a token usable by client device 130. In response to receiving a token, authenticator 210 may provide the token (e.g., token 150) to device 130.

Token generator 215, in one embodiment, is operable to generate token 150, which may include either a subset or all of permissions for a particular client, and provide the token to authenticator 210 for sending it to device 130. In other embodiments, generator 215 generates and provides a token to handler 220 in response to a request from handler 220. In various embodiments, generator 215 may encode token 150 with a selected subset of permissions based on a JSON Web Token format, such as that defined by Request for Comments (RFC) 7519.

There are various ways in which the subset of permissions may be selected according to the present disclosure. In one instance, generator 215 may retrieve permissions 125 and selection information 203 from database 200 and select a subset of permissions based on information 203. In another instance, generator 215 may retrieve permissions 125 including the identifier for each permission and select a subset of permissions based on each identifier. In yet another instance, database 200 may send only those permissions that have an identifier specifying that that given permission should be included. Thus, the permissions that generator 215 receives may constitute a subset of the total permissions. After selecting (or receiving) a subset, generator 215 may create and transmit, to either authenticator 210 or handler 220, a token 150 that includes the subset (and, in some cases, all) of permissions 125.

Permission miss handler 220, in one embodiment, receives a permission request 160, which may include a unique ID, a session ID usable to reject the token at a later time, and a requested permission. In some embodiments, handler 220 stores the unique ID and the requested permission along with other metrics to describe permission request 160 such as time received. For example, handler 220 may receive a particular permission request 160 that includes a unique ID, "jSmith," and a requested permission, "edit bald eagle document." In various embodiments, prior to searching for a requested permission, handler 220 may verify that permission request 160 has been signed by application server 120. Thereafter, handler 220 may request permissions 125 from database 200. After receiving permissions 125, handler 220 may compare the requested permission to each permission included in permission 125. In the case where there is a match, handler 220 may update selection information 203 and generate permission response 170, which may include a new token 150 from token generator 215, the requested permission, or an acknowledgement that a client has (or does not have) the requested permission.

In various embodiments, handler 220 may retrieve selection information 203 to determine whether the permissions to be selected for a future token should be updated. That is, in the cases in which each permission has a flag/identifier that indicates whether it should be included in a token, handler 220 may determine whether one or more flags should be updated based on the information 203. As an example, in response to receiving request 160, handler 220 may determine that a client has the requested permission and that it should be included in a subsequent token based on the client's usage of that permission. As such, handler 220 may change the flag associated with that permission in permissions 125 to indicate that it should be included. In some cases, handler 220 may change other flags to indicate that other permissions should not be included.

Figure 3:
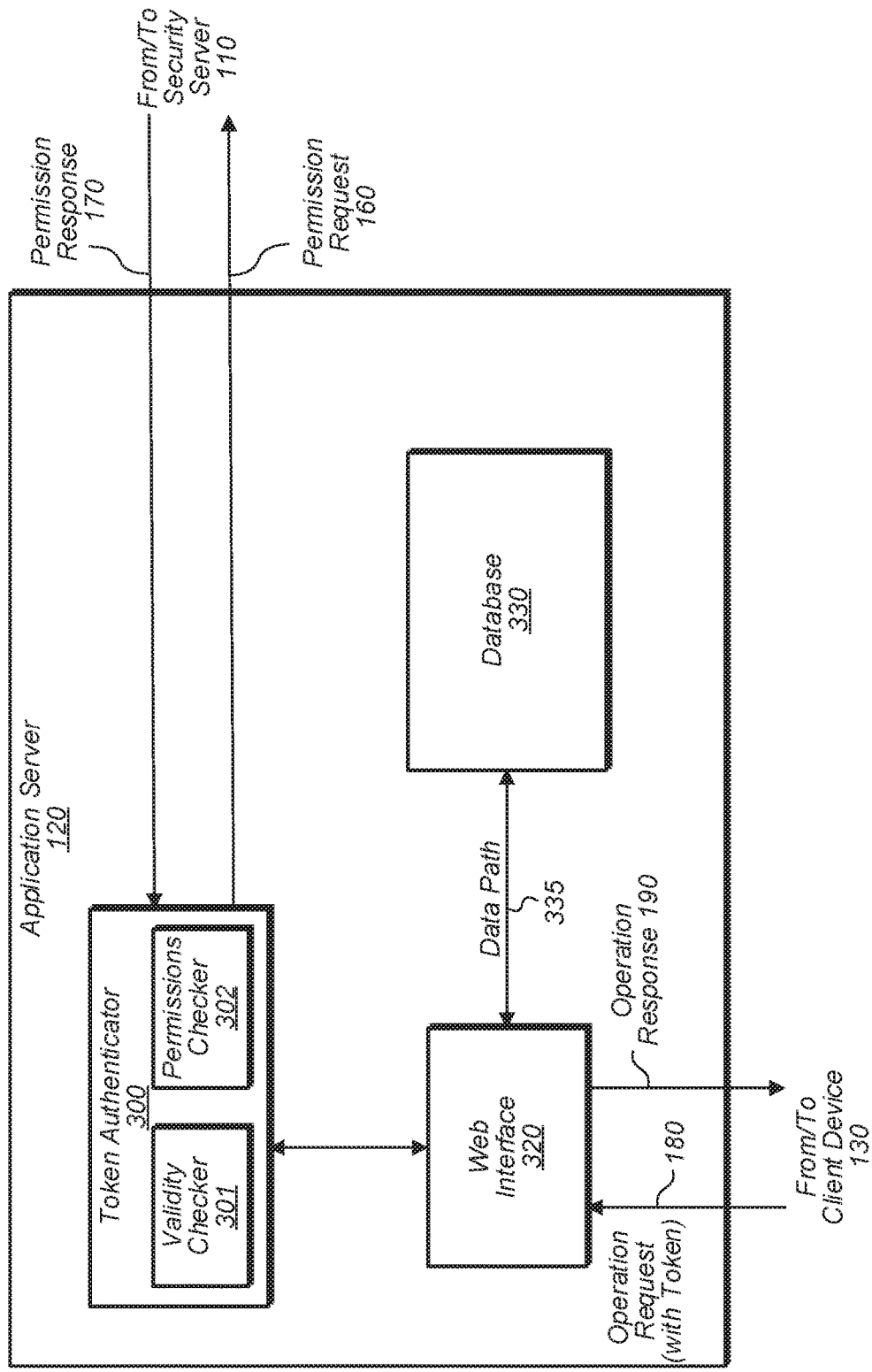
FIG. 3 is a block diagram illustrating exemplary elements of an application server that perform operations included in operation requests, according to some embodiments.

Turning now to FIG. 3, a block diagram of application server 120 is depicted. In the illustrated embodiment, application server 120 includes various modules, including token authenticator 300, web interface 320, as well as database 330. As will be described below, application server 120 may receive operation request 180 with a token at web interface 320 and permission response 170 from security server 110. Furthermore, web interface 320 may perform operations on data stored at database 330 or retrieve data from database 330 via data path 335 and may transmit response 190 and/or the data to client device 130. In the instances in which a presented token lacks a necessary permission, token authenticator 300 may send, to security server 110, permission request 160 for determining whether a client has permission.

Token authenticator 300, in certain embodiments, may be operable to receive operation request 180 and an associated token, and then check the validity of the token, as well as determine whether the operation specified by request 180 is permitted in view of the permissions indicated by the associated token. To this end, token authenticator 300 may include, in certain embodiments, validity checker module 301 and permission checker module 302. Token authenticator 300 may use session IDs stored within validity checker module 301 to reject tokens provided by client device 130. In various embodiments, permissions checker module 302 may include a syntax for determining how a permission should be structured and interpreted Validity checker module 301 may, in various embodiments, determine the authenticity of a token included with request 180 by verifying a signature of the token against information accessible to module 301. Module 301 may alternatively or in addition check whether a token is still valid. For example, module 301 may check a time stamp associated with the token against a current time, or module 301 may determine whether a session ID associated with the token is one of a list of currently valid or invalid sessions maintained by authenticator 300. (To effectuate such a list, security server 110 may communicate currently valid or invalid session IDs via a data path not shown in FIG. 3). Such mechanisms may allow tokens and their associated permissions to be revoked. In some embodiments, however, authenticator 300 may not include validity checker module 301.

After the provenance and timeliness of a token are verified by module 301, module 302 may determine whether an operation specified by request 180 is encompassed by one of the permissions indicated by the token or tokens associated with the request. To do so, module 302 may interpret each permission based on a syntax agreed upon by security server 110 and application server 120. In some cases, a syntax may indicate that an operation should precede a data identifier (i.e., the data that the operation may be performed on) and thus application server 120 may interpret the first portion of a permission to be the operation. As example, a permission may be structured to read "edit specific company document." Accordingly, when application server 120 receives a request from a client to move the document, server 120 may compare "move" against "edit" and, in doing so, determine that the permission is not usable for this request. In the cases where a requested operation matches a permission's specified operation, application server 120 may proceed to check the second portion of the permission. In some embodiments, upon determining that a client has the required permission, token authenticator 300 transmits a positive indication to web interface 320; in other embodiments, when the client does not have the required permission, token authenticator 300 sends permission request 160 to security server 110 and a negative indication to web interface 320.

In other embodiments, operation request 180 may not include a token and may instead be associated with a previously transmitted token or a token to be transmitted after the request. For example, in one embodiment, a first operation request 180 may be transmitted with a token; both may be associated with a session ID. Authenticator 300 may store the token, such that when subsequent operation requests are received that specify that session ID, it may be determined whether that ID is still valid, and if so, pass the request to module 302.

Moreover, authenticator 300 may generate permission request 160 so that it includes a unique ID, a session ID, the missed permission, and information identifying the requesting application server 120 (for cases in which there are several application servers). In various embodiments, authenticator 300 is operable to receive permission response 170 from security server 110 and extract the contents to determine whether client device 130 has the required permission. In some embodiments, permission response 170 may include a new token and, as such, authenticator 300 may provide the token to client device 130.

Web interface 320, in one embodiment, receives operation requests 180 and tokens (e.g., token 150) from client device 130 and performs operations to fulfill the requested actions included in operation requests 180. Web interface 320 may transmit operation request 180 and token 150 to token authenticator 300 and receive, in response, an indication of whether the client has the required permission. In several embodiments, upon receiving a positive indication (i.e., a client has permission to perform a requested action), web interface 320 performs the requested action and transmits operation response 190 to client device 130. In some embodiments, upon receiving notification that the client does not have the required permission, web interface 320 may transmit operation response 190 to client device 130, which indicates a failed operation request 180. In other embodiments, web interface 320 may wait for a response from security server 110 before transmitting operation response 190 to client device 130.

Database 330 is an example of data store operable to store files, applications, and other forms of data to be retrieved or operated on by application server 120. Database 330 may receive a request for data from web interface 320 and transmit the data to web interface 320 via data path 335. In some embodiments, database 330 includes circuitry configured to encrypt and decrypt the data stored at database 330. In one embodiment, database 330 stores an identifier for each resource in database 330 so that web interface 320 may retrieve the resources referenced by permissions in token 150. As an example, a client may request to open a video file and, as such, web interface 320 may send an identifier associated with the video file to database 330. Accordingly, database 330 may use the identifier to look up the video file and provide it web interface 320.

Figure 4:
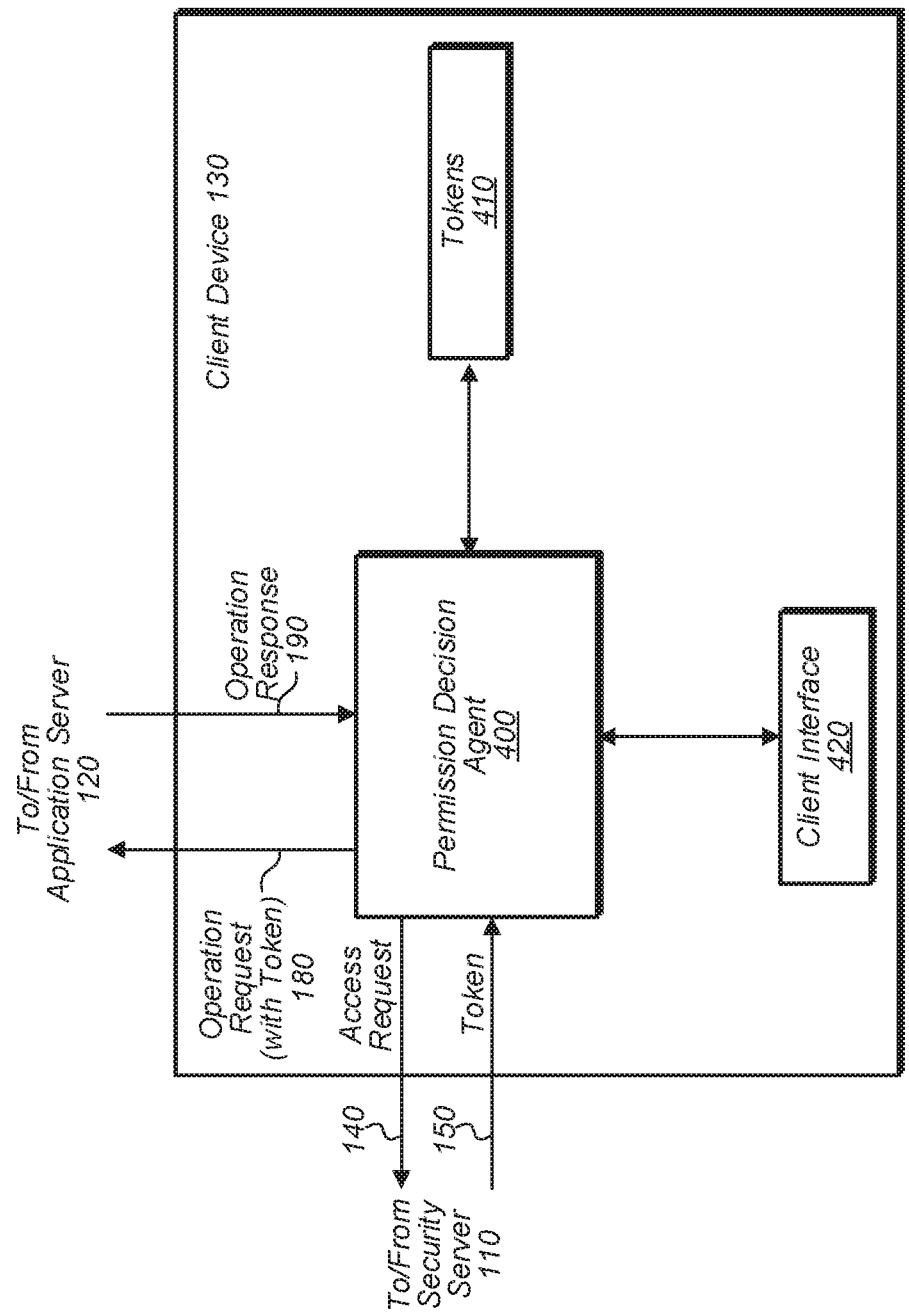
FIG. 4 is a block diagram illustrating exemplary elements of a client device that retrieves tokens and send operation requests, according to some embodiments.

Turning now to FIG. 4, a block diagram of one embodiment of a client device 130 is shown. In general, client device 130 is representative of any device or computer system configured to make a permission request to an application server. In the illustrated embodiment, client device 130 includes various modules such as a permission decision agent 400, tokens 410, and a client interface 420. As will be described below, client device 130 may receive various types of input from a client (i.e., a user of client device 130) via client interface 420, including various requests to perform actions on application server 120. These requests may be processed and sent to application server 120 by permission decision agent 400. Tokens 410 refers to storage indicating the contents of tokens currently stored by client device 130. As discussed previously, some of the tokens stored in 410 may be invalidated by other computers in the system.

Permission decision agent 400, in one embodiment, is a software module operable to send client requests to an application server. Initially, agent 400 may receive a request from a client through client interface 420. In turn, agent 400 may determine if a token usable with the request is stored in tokens 410. In various embodiment, if no such token is available, agent 400 causes a request for a token (e.g., access request 140) to be made to security server 110; conversely, if a token is available in tokens 410, then the token may be supplied to application server 120, as part of operation request 180, accompanying request 180, or in manner where the token is associated with request 180.

While the attributes of a token may be hidden (e.g., encrypted) from client device 130, in various embodiments, client device 130 may store (along with a given token) information pertaining to the origin of the token, the time of reception of the token, who the token is associated with, etc. Agent 400 may use this information in determining whether a token is usable for operation request 180. As an example, Bob may request via client interface 420 that application server 120 open a document. In response to the request, Agent 400 may search tokens 410 for a token and determine that there is only a token for Bill (based on the information that was stored in association the token). In such cases, agent 400 may collect verification information (e.g., username and password) from the client and send access request 140 including the verification information to security server 110 for a token associated with that client.

Figure 5A:
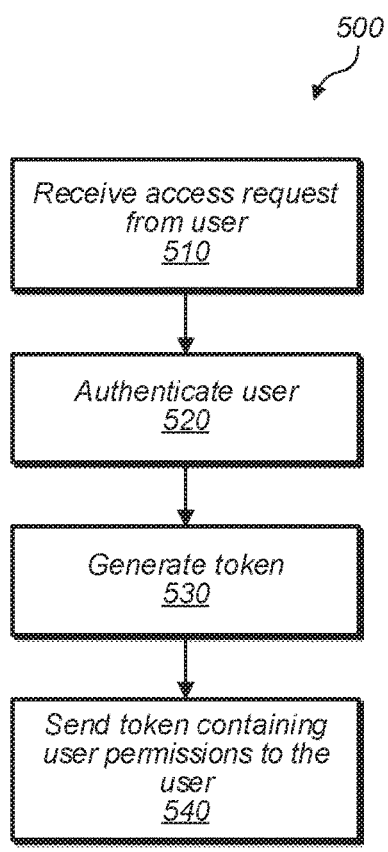
FIG. 5A is a flow diagram illustrating an exemplary method for generating a token that includes one or more permissions.

Turning now to FIG. 5A, a flow diagram of a method 500 is shown. Method 500 is one embodiment of a method performed by a computer system (e.g., security server 110) to generate a token (e.g., token 150). In many instances, before a client may gain access to data stored by an application server (e.g., application server 120) or request the application server to perform operations on said data, the client may need to request a token (e.g., access request 140) from the computer system. In some embodiments, the steps of method 500 may be performed to generate a token that includes a subset of permissions (or all of the permissions if below a maximum threshold) associated with the client. In various embodiments, the steps of method 500 may include additional steps—e.g., invaliding tokens previously issued to the client.

Method 500 begins in step 510 with a computer system receiving a request from a client via a computing device (e.g., client device 130) for a token that may allow the client to cause an application server to perform operations on data stored in a database (e.g., database 330). In some embodiments, the computer system may determine whether the request includes a client ID (e.g., username) and verification information (e.g., password) that is usable to both authenticate the client as well as retrieve a subset or all of the permissions associated with the client. In the case where the request does not include this information, the computer system may simply reject the request or send a notification to the computing device requesting the missing information. When the computer system receives the necessary information, method 500 proceeds to step 520.

In step 520, the computer system authenticates the client. After extracting the client ID and verification information from the request, the computer system may retrieve information (e.g., authentication information 201) from an account tied to the client using the client ID. Upon retrieving the information, in some embodiments, the computer system may hash the verification information/password and compare it with a portion of the retrieved information (i.e., a password that was hashed before being stored). In one embodiment, method 500 proceeds to step 530 in response to a match otherwise the computer system may reject the request, ending method 500.

In step 530, the computer system generates a token, which may include a subset or all of the permissions available to the requesting client. In some embodiments, the computer system may retrieve both the client's permissions (e.g., permissions 125) and their past behavior information (e.g., selection information 203) from a database at the computer system (e.g., client profile database 200) using the client ID. The computer system may use this past behavior information (e.g., most recently used permissions) to select the subset (or all) of the permissions to be included in the token. In other embodiments, each permission of the client's permissions is tagged with an identifier that indicates whether or not to include that permission in a token. In the same embodiment, the computer system may select the permissions to be included in the token based on the identifiers. After selecting the subset of permissions, the computer system may generate the token to include the subset (or all) and then sign it. In step 540, the computer system sends the token to the computing device.

Figure 5B:
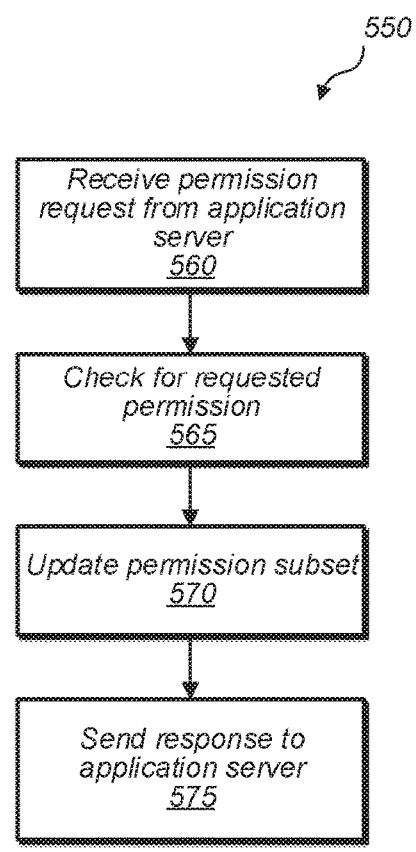
FIG. 5B is a flow diagram illustrating an exemplary method for processing a permission miss.

Turning now to FIG. 5B, a flow diagram of a method 550 is shown. Method 550 is one embodiment of a method performed by a computer system (e.g., security server 110) to determine whether a client has a particular permission. In many instances, upon ascertaining that a permission needed for an operation is not included in a token (e.g., token 150) supplied by a client using a computing device (e.g., client device 130), an application server (e.g., application server 120) may send a request (e.g., permission request 160) to the computer system inquiring whether the client has permission. In some embodiments, the steps of method 500 may be performed to update the subset of permissions that may be included in a future token. In various embodiments, the steps of method 500 may include additional steps—e.g., invaliding tokens previously issued to the client.

Method 550 begins in step 560 with a computer system receiving a request from an application server to determine whether permissions stored for a client (e.g., permissions 125) include a particular permission. In some embodiments, the computer system may retrieve all of the permissions associated with the client using a client ID included in the request.

In step 565, the computer system compares the requested permission against each permission available to the client. In various embodiments, the computer system may determine a match in which case method 550 proceeds to step 570. In step 570, computer system may update the subset of permissions to be included in a subsequent token to include the requested permission. Thereafter, in step 575, the computer may send a response (e.g., permission response 170) that includes new token or an acknowledgment to the application server. In some embodiments, if the computer system does not determine a match, method 550 may proceed to step 575 from step 565 (i.e., skipping step 570) where the computer system may send a response that includes a negative acknowledgment (i.e., client does not have permission).

Figure 5C:
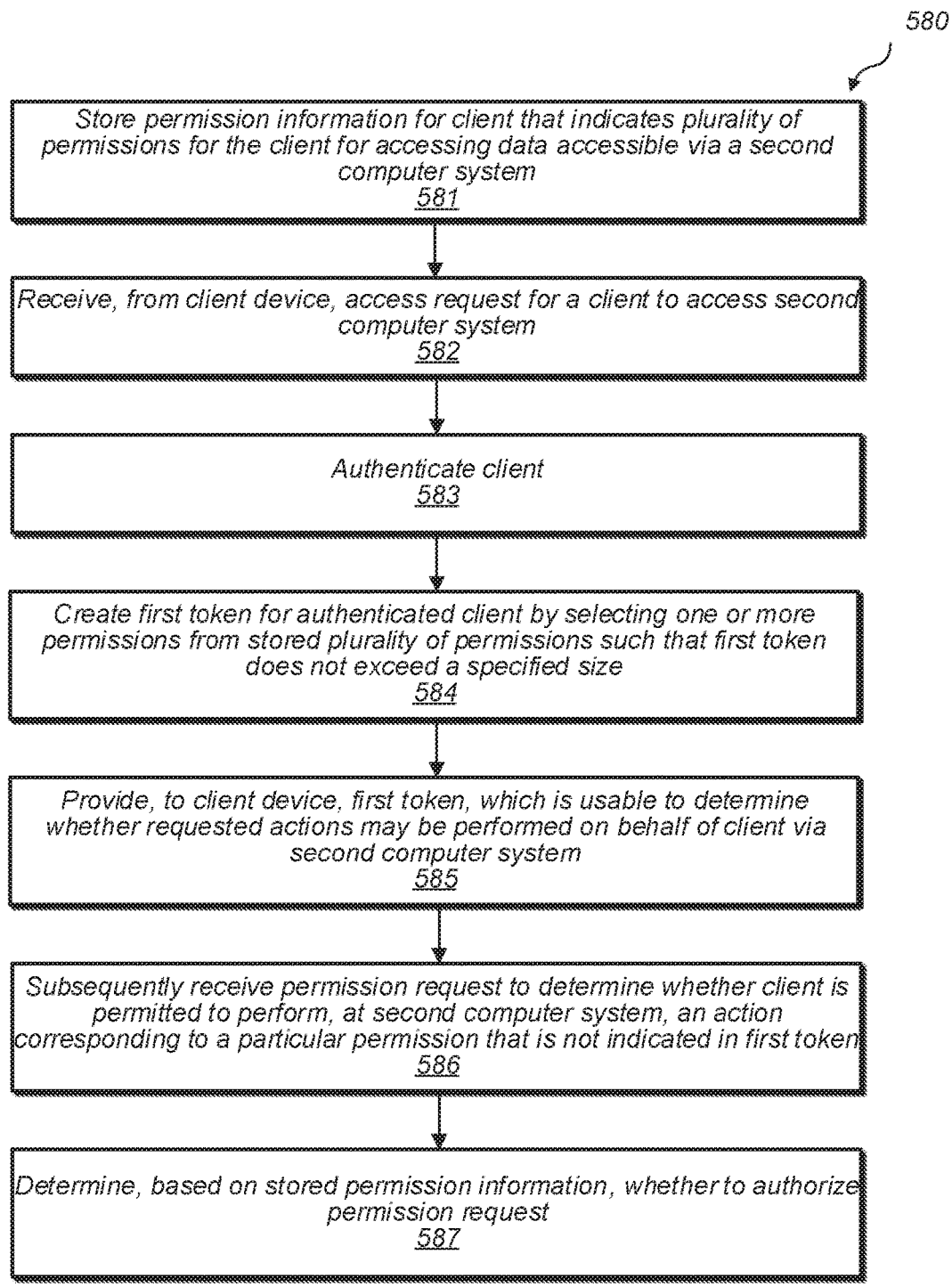
FIG. 5C is a flow diagram illustrating an exemplary method for generating a token and processing a permission miss.

Turning now to FIG. 5C, a flow diagram of a method 580 is shown. Method 580 is one embodiment of a method performed by a computer system (e.g., security server 110) to both generate a token (e.g., token 150) and determine whether a client has a particular permission in response to a permission request (e.g., permission request 160).

Method 580 begins in step 581 with a computer system storing, for a client, a plurality of permissions (e.g., permissions 125) that permit the client to cause a second computer system (e.g., application server 120) to perform one or more actions on behalf of the client. In some embodiments, the computer system stores permissions for one or more tenants that have a plurality of clients. In step 582, the computer system receives from a client device (e.g., client device 130) a request to access the second computer system. In step 583, the computer system authenticates the client based on verification information (e.g., username and password) supplied in the received request. After authenticating the client, in step 584, the computer system creates a token for the authenticated client by selecting one or more permissions from the stored plurality of permissions such that the token does not exceed a specified size. In step 585, the computer system provides the created token to the user, who may use the token to request the second computer system to perform requested operations. In step 586, the computer system receives from the second computer system a request to determine whether a client has a permission not included in the created token provided earlier to the client. In step 587, the computer system determines whether the client has the requested permission by searching the stored plurality of permissions for the requested permission.

Figure 6A:
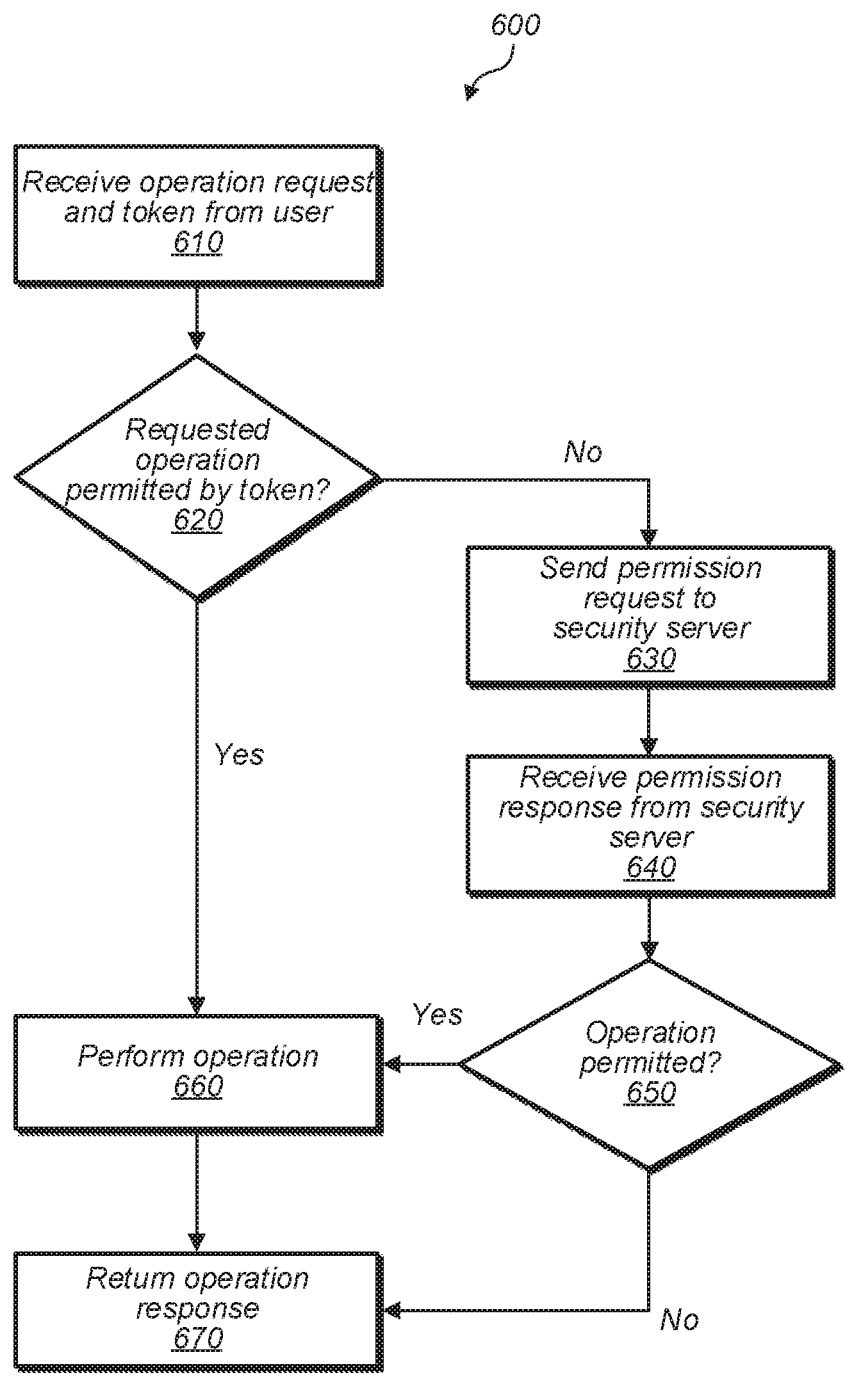
FIG. 6A is a flow diagram illustrating an exemplary method for performing an operation request based on whether a client has a particular permission.

Turning now to FIG. 6A, a flow diagram of a method 600 is shown. Method 600 is one embodiment of a method performed by a computer system (e.g. application server 120) to carry out an operation on behalf of a client. In many instances, when a client wishes to gain access to data stored in a database (e.g., database 330) or perform an operation on said data, the client may send a request (e.g., operation request 180) and a token (e.g., token 150) via a computing device (e.g., client device 130) to the computer system causing it to perform the steps of method 600. In various embodiments, the steps of method 600 may include additional steps—e.g., comparing a session ID encoded in a token against session IDs stored by the computer.

Method 600 begins in step 610 with a computer system receiving a request (and a token) from a client to perform an operation on data stored at the computer system. Upon receiving the request, in some embodiments, the computer system may verify a signature used to sign the token in order to determine if the token originated from a server (e.g., security server 110) associated with the computer system. In various embodiments, after ascertaining that the token both originated from a valid source and is valid, the computer system may extract the permissions included in the token. In one embodiment, based on the requested operation, the computer system may determine a permission needed for the operation.

In step 620, the computer system may compare each permission included in the token with a permission associated with the requested operation. Upon determining that the token does not include the needed permission, in step 630, the computer system may send a request (e.g., permission request 160) to the server inquiring whether the needed permission may be found in the permissions associated with the client. In step 640, the computer system may receive a response (e.g., permission response 170) from the server and thus, in step 650, the computer system may determine from the response whether the client has permission. Once the computer system has concluded that the client has the permission, method 600 proceeds to 660.

In step 660, the computer system performs the requested operation on behalf of the client. In step 670, the computer system returns a response (e.g., operation response 190) to the client. In some embodiments, the response indicates that the operation has been performed; in other embodiments, the response provides details as to why the requested operation will not be performed (e.g., the client does not have permission, the token is invalid, etc.)

Figure 6B:
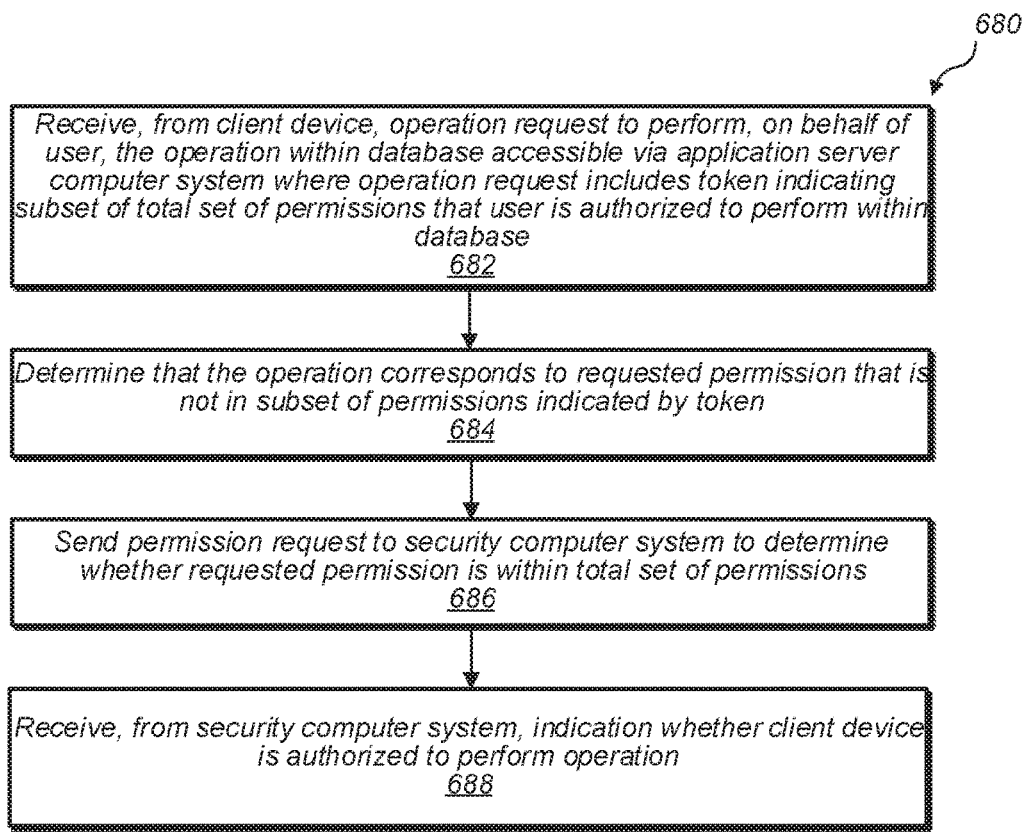
FIG. 6B is a flow diagram illustrating another exemplary method for performing an operation request based on whether a client has a particular permission.

Turning now to FIG. 6B, a flow diagram of a method 680 is shown. Method 680 is one embodiment of a method performed by a computer system (e.g. application server 120) to determine whether a client is permitted to request that the computer system perform a particular operation.

Method 680 begins in step 682 with a computer system receiving a request from a client device (e.g., client device 130) to perform an operation within the database that is accessible via the computer system. In various embodiments, the request includes a token that includes a subset of a total set of permission that indicate that the user is authorized to perform certain operations within the database. In step 684, the computer system determines the requested operation is not in the subset of permissions indicated by the token. In step 686, the computer system sends to a second computer system (e.g., security server 110) a request to determine whether the client has a requested permission within his or her total set of permissions. In step 688, the computer system receives, from the second computer system, an indication that specifies whether the client is authorized to perform the requested operation.

Figure 7:
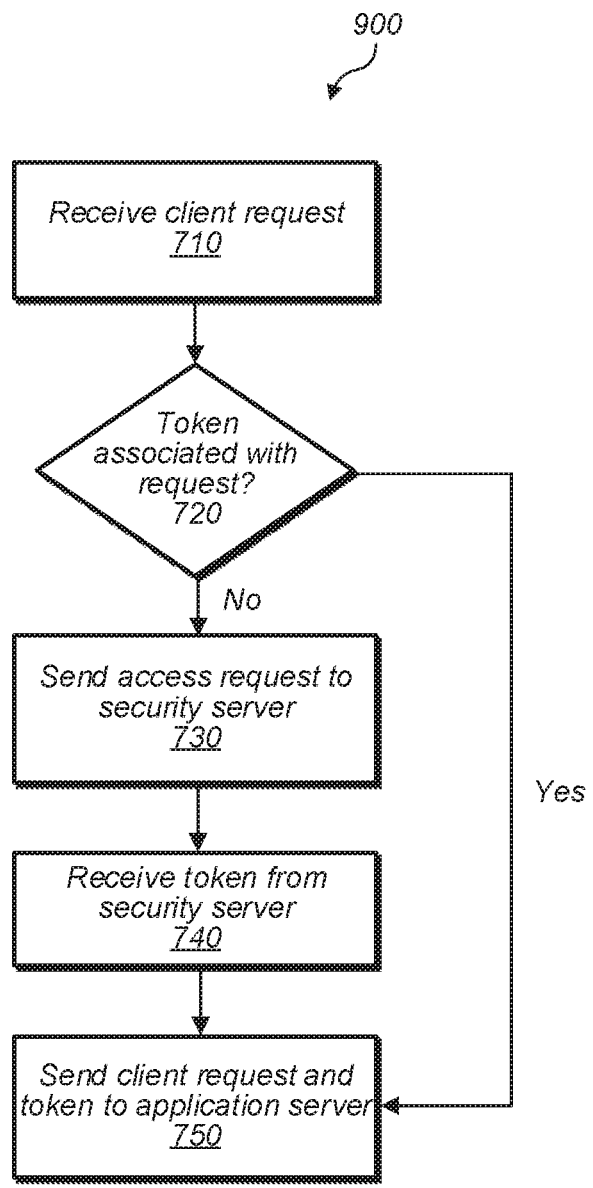
FIG. 7 is a flow diagram illustrating an exemplary method for requesting an application server to perform an operation.

Turning now to FIG. 7, a flow diagram of a method 700 is shown. Method 700 is one embodiment of a method performed by a computer system (e.g. client device 130) to retrieve a token. In many instances, when a client wishes to gain access to data stored in a database (e.g., database 330) or perform an operation on said data, the computer system may perform the steps of method 700 in order retrieve a token usable to request that an application server (e.g., application server 120) perform operations on behalf the client. In various embodiments, the steps of method 700 may include additional steps—e.g., storing the received token at the computer system.

Method 700 begins in step 710 with a computer system receiving a request from a client to request an operation be performed by application server. In step 720, upon receiving the request, in some embodiments, the computer system may retrieve any stored tokens from a storage element (e.g., tokens 410). Thereafter, the computer system may determine whether any of those tokens are usable to request the operation from the application server. In some embodiments, if a token is found that may be used for the request, then method 700 proceeds to step 750 where the computer system sends both the request and the token; otherwise, method 700 proceeds to step 730.

In step 730, the computer system sends a request (e.g., access request 140) to a security server (e.g., security server 11) for a token. In some embodiments, the request includes a client ID and verification information usable by the security server to both authenticate the client and retrieve the client's permissions. In step 740, the computer system receives a token from the security server. In step 750, the computer system sends both the request and the token.

Exemplary Multi-Tenant Database System

Figure 8:
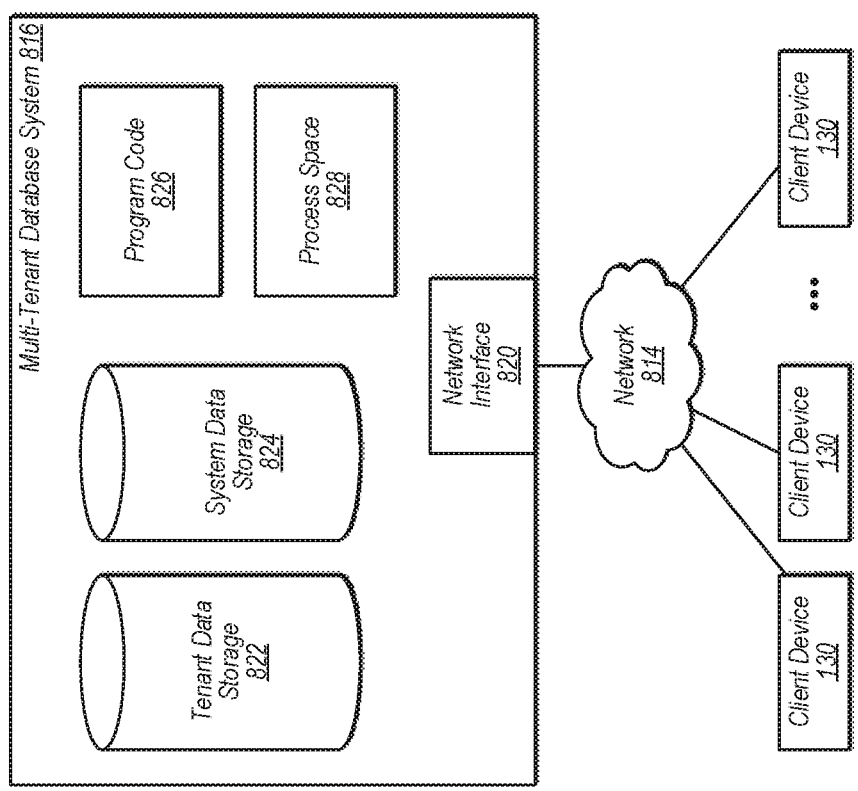
FIG. 8 is a block diagram illustrating an exemplary environment for a multi-tenant database system, according to some embodiments.

Turning now to FIG. 8, a block diagram of one embodiment of a multi-tenant database system is shown. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. In various embodiments, multi-tenant database system (MTS) 816 implements security server 110 or application server 120 as disclosed above. As illustrated in FIG. 8 (and in more detail in FIG. 9) one or more client device 130 may interact via a network 814 with MTS 816. The clients of those client devices 130 may be clients in differing capacities and the capacity of a particular client device 130 might be determined by the current client. For example, when a salesperson is using a particular client device 130 to interact with MTS 816, that client device 130 may have the capacities allotted to that salesperson. However, while an administrator is using the same client device 130 to interact with MTS 816, it has the capacities allotted to that administrator.

Network 814 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

Client devices 130 may communicate with MTS 816 using TCP/IP and, at a higher network level, use other common Internet protocols to communicate, such as HTTP, FTP, AFS, WAP, etc. As an example, where HTTP is used, client device 130 might include an HTTP client commonly referred to as a "browser" for sending and receiving HTTP messages from an HTTP server at MTS 816. Such a server might be implemented as the sole network interface between MTS 816 and network 814, but other techniques might be used as well or instead. In some implementations, the interface between MTS 816 and network 814 includes load sharing functionality, such as round-robin HTTP request distributors to balance loads and distribute incoming HTTP requests evenly over a plurality of servers. Preferably, each of the plurality of servers has access to the MTS's data, at least for the clients that are accessing a server.

In some embodiments, the system shown in FIG. 8 implements a web-based customer relationship management (CRM) system (e.g., application server 120). For example, in some embodiments, MTS 816 includes application servers 120 configured to implement and execute CRM software applications as well as provide related data, code, forms, web pages and other information to and from client device 130 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 816 is shown in FIG. 8, including a network interface 820, storage 822 for tenant data, storage 824 for system data accessible to MTS 816 and possibly multiple tenants, program code 826 for implementing various functions of MTS 816, and a process space 828 for executing MTS system processes and tenant-specific processes, such as running applications as part of an application service.

Several elements in the system shown in FIG. 8 may include conventional, well-known elements that need not be explained in detail here. For example, each client device 130 may be a desktop personal computer, workstation, laptop, PDA, cell phone, or any WAP-enabled device or any other computing device capable of interfacing directly or indirectly to the Internet or other network connection. Client device 130 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a client (e.g., subscriber of a CRM system) of client device 130 to access, process, and view information and pages available to it from MTS 816 over network 814. Each client device 130 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 816 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each client device 130 and its components are operator configurable using applications, such as a browser, that include computer code executable on one or more processing elements. Similarly, in some embodiments, MTS 816 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 816 is configured to provide web pages, forms, applications, data, and/or media content to client device 130 to support the access by client device 130 as tenants of MTS 816. In order for client device 130 to access MTS 816, in various embodiments, client device 130 may provide a token (e.g., token 150) that includes a set of permissions that indicate operations that the client may cause MTS 816 to perform on behalf of the client. Furthermore, MTS 816 may provide security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 9:
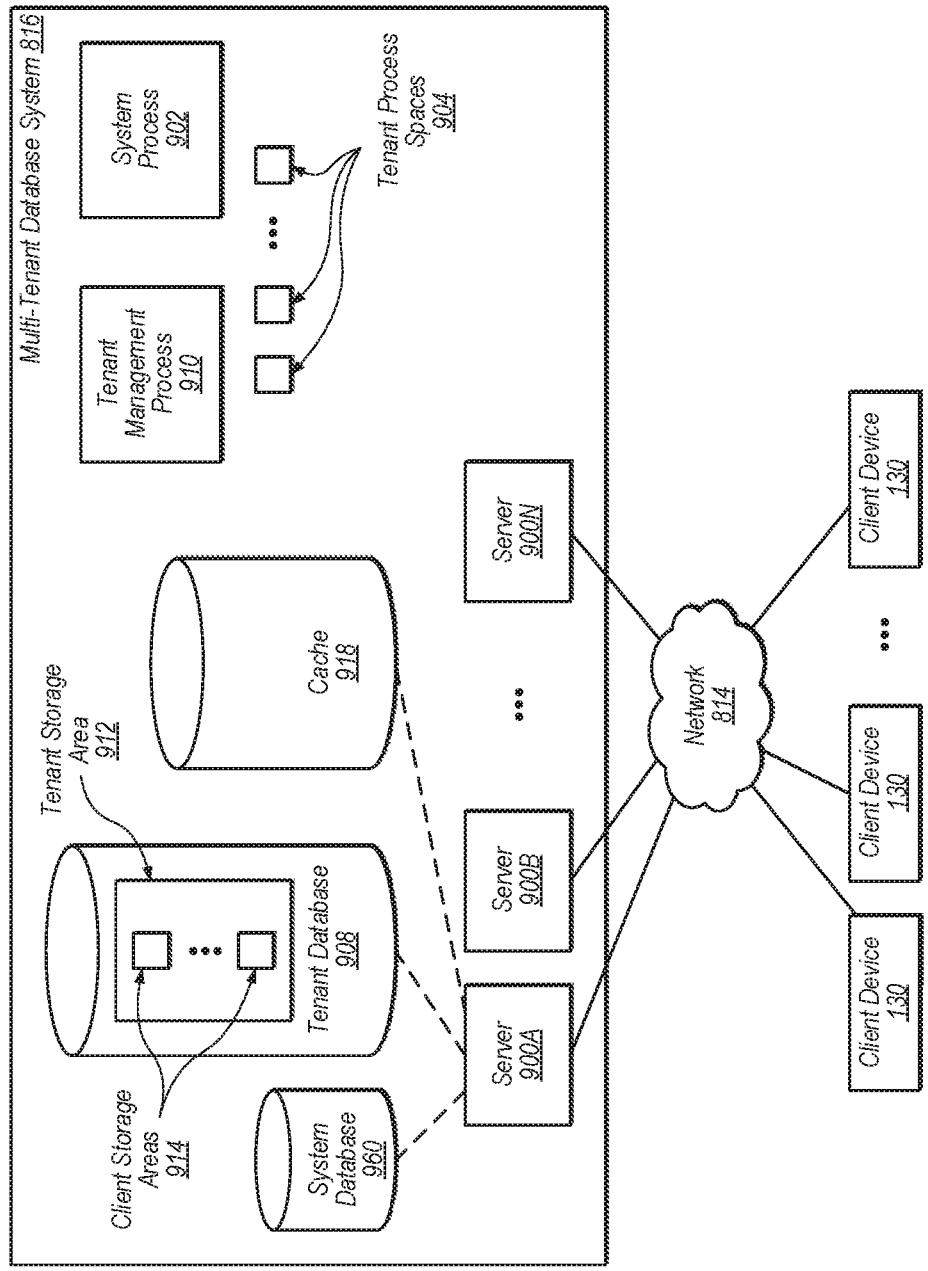
FIG. 9 is a block diagram illustrating an exemplary multi-tenant database system in more detail, according to some embodiments.

FIG. 9 illustrates exemplary embodiments of an MTS 816 and various interconnections in more detail. As noted above, in various embodiments, MTS 186 may implement security server 110 or application server 120. In this example, the network interface is implemented as one or more HTTP servers 900. Also shown is system process space 902 including individual tenant process spaces 904, a system database 906, tenant database(s) 908 and a tenant management process space 910. Tenant database 908 may be shared across application servers and may be divided into individual tenant storage areas 112, which can be either a physical arrangement or a logical arrangement. Within each tenant storage area 912, client storage 914 might be allocated for each client.

In the illustrated embodiment, each server 900 also includes at least a portion of a cache 118. In some embodiments, client devices 130 that utilize web applications can request that data be stored in cache 118 (e.g., using a "put" operation) and later retrieve the data (e.g., using a "get" operation) rather than re-generating the data. In various embodiments, when sending a request to store or retrieve data, client device 130 may present a token (e.g., token 150) that includes a set of permissions that indicate whether client device 130 may request such an action. In some embodiments, capacity limits may be assigned to different clients/users/tenants/partitions, etc. and cached data may be evicted in order to remain below the allotted capacity. In some embodiments, cached data for a particular tenant is kept private from other tenants. Further, the visibility scope for cached data within a particular tenant may be configurable.

In some embodiments, cache 918 is split across multiple servers 900. In some embodiments, splitting across multiple instances may allow the data in cache 918 to fit in system memory space, which may improve response times relative to storing data for cache 918 in disk storage, for example. As used herein, an "in-memory cache" is a cache that stores data in system memory space (which typically means that the data can be stored in RAM) rather than requiring paging for storage (as is typically required for traditional disc storage, for example). Cache 918 may also be a "multi-tenant" cache in the sense that a single cache is used to provide separate virtual caches for multiple different tenant entities. The different tenants may use the same data structure to store data or different tenants may have different data structures. In various embodiments, multi-tenant caches enforce data security between tenants such that data from one tenant is not available to other tenants. Thus, as used herein, the term "tenant" in the context of a multi-tenant cache refers to an entity for which cache entries are separately maintained such that different tenants cannot access each other's data. In some embodiments, tenants may authorize other tenants to access their data via the cache, while in other embodiments a given tenant's data may be accessible to only that tenant via the multi-tenant cache (although that tenant may subsequently share data retrieved from the cache, as that tenant desires).

It should also be understood that each server 900 may be communicably coupled to database systems, e.g., system database 906 and tenant database(s) 908, via, a different network connection. For example, one server $900_1$ might be coupled via the Internet 814, another server $900_{N-1}$ might be coupled via a direct network link, and another server $900_N$ might be coupled by yet a different network connection. Transfer Control Protocol and Internet Protocol (TCP/IP) are preferred protocols for communicating between servers 900 and the database system, however, it will be apparent to one skilled in the art that other transport protocols may be used to optimize the system depending on the network interconnect used.

In preferred aspects, each server 900 is configured to handle requests for any client/user/organization. Because it is desirable to be able to add and remove servers from the server pool at any time for any reason, there is preferably no server affinity for a client/user and/or organization to a specific server 900. In one embodiment, therefore, an interface system (not shown) implementing a load balancing function (e.g., an F5 Big-IP load balancer) is communicably coupled between the servers 900 and the client devices 130 to distribute requests to the servers 900. In one aspect, the load balancer uses a least connections algorithm to route client requests to the servers 900. Other examples of load balancing algorithms, such as are round robin and observed response time, also can be used. For example, in certain aspects, three consecutive requests from the same client could hit three different servers, and three requests from different clients could hit the same server. In this manner, MTS 816 is multi-tenant, wherein the MTS 816 handles storage of different objects and data across disparate clients and organizations.

As an example of storage, one tenant might be a company that employs a sales force where each salesperson uses MTS 816 to manage their sales process. Thus, a client might maintain contact data, leads data customer follow-up data, performance data, goals and progress data, all applicable to that client's personal sales process (e.g., in tenant database 908). In some MTS embodiments, since all of this data and the applications to access, view, modify, report, transmit, calculate, eta, can be maintained and accessed by a client device having nothing more than network access, the client can manage his or her sales efforts and cycles from any of many different client devices. For example, if a salesperson is paying a visit to a customer and the customer has Internet access in their lobby, the salesperson can obtain critical updates as to that customer while waiting for the customer to arrive in the lobby.

While each client's sales data may be separate from other clients' sales data regardless of the employers of each client, some data may be organization-wide data shared or accessible by a plurality or all of the sales for a given organization that is a tenant. Thus, there may be some data structures managed by MTS 816 that are allocated at the tenant level while other data structures are managed at the client level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to client-specific data and tenant-specific data, MTS 816 might also maintain system level data usable by multiple tenants. Such system level data might include industry reports, news, postings, and the like that are sharable among tenants.

In certain aspects, client devices 130 communicate with servers 900 to request and update system-level and tenant-level data from MTS 816 that may require one or more queries to database system 906 and/or database system 908. In some embodiments, MTS 816 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

Exemplary Computer System

Figure 10:
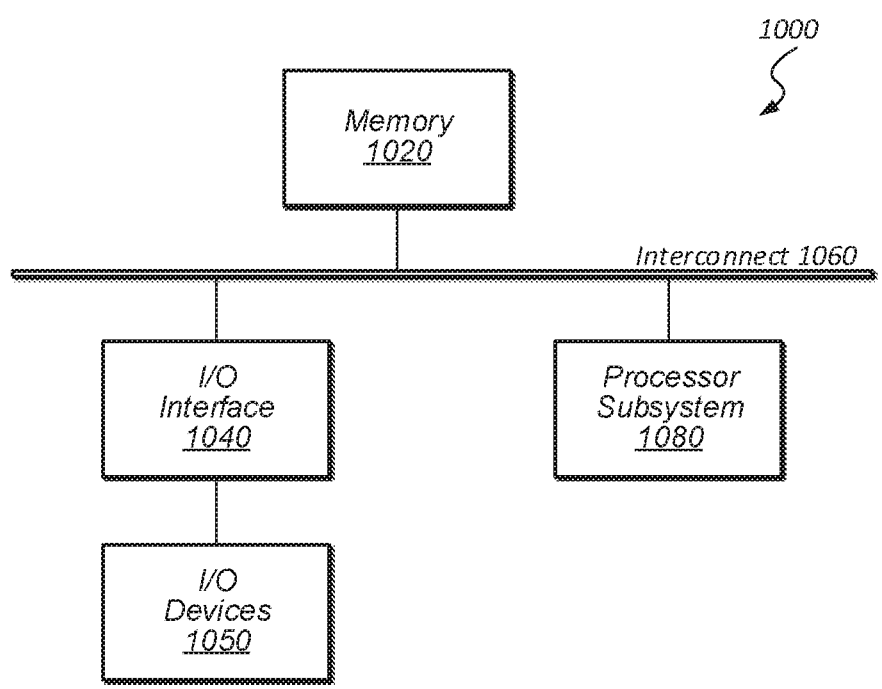
FIG. 10 is a block diagram illustrating an exemplary computer system, according to some embodiments.

Turning now to FIG. 10, a block diagram of an exemplary computer system 1000, which may implement security server 110, application server 120, and client device 130, is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1000 is shown in FIG. 10 for convenience, system 1000 may also be implemented as two or more computer systems operating together.

Processor subsystem 1080 may include one or more processors or processing units. In various embodiments of computer system 1000, multiple instances of processor subsystem 1080 may be coupled to interconnect 1060. In various embodiments, processor subsystem 1080 (or each processor unit within 1080) may contain a cache or other form of on-board memory.

System memory 1020 is usable store program instructions executable by processor subsystem 1080 to cause system 1000 perform various operations described herein. System memory 1020 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080. In some embodiments, the modules described above may include (or be included within) system memory 1020.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices 1050 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1050 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are capable of causing a first computer system to perform operations comprising:
    storing permission information for a client, wherein the permission information indicates a plurality of permissions for the client for accessing data accessible via a second computer system;
    receiving, from a client device, an access request, wherein the access request is a request to permit the client to access the second computer system;
    authenticating the client;
    creating a first token for the authenticated client, including by selecting one or more permissions from the stored plurality of permissions, wherein the creating is performed such that the first token does not exceed a specified size; and
    providing, to the client device, the first token, wherein the first token is usable to determine whether requested actions may be performed on behalf of the client via the second computer system;
    subsequently receiving a permission request to determine whether the client is permitted to perform, at the second computer system, an action corresponding to a particular permission that is not indicated in the first token;
    determining, based on the particular permission being stored by the first computer system as one of the plurality of permissions for the client, to authorize the permission request; and
    creating a subsequent, second token having a set of permissions selected by replacing one of the one or more permissions used in the first token with the particular permission in response to the one or more permissions corresponding to a maximum possible number of permission for a token.

2. The computer readable medium of claim 1, wherein the operations further comprise:
    providing the second token to the client device.

3. The computer readable medium of claim 1, wherein the operations further comprise:
    using a private key to sign the first token;
    formatting the first token as a browser cookie presentable by a web browser of the client device to the second computer system; and
    providing a public key associated with the private key to the second computer system for determining that the first computer system signed the first token.

4. The computer readable medium of claim 1, wherein the selected one or more permissions are a subset of the plurality of permissions and are chosen to include in the first token based on which of the plurality of permissions have been most recently used by the client.

5. The computer readable medium of claim 1, wherein the operations further comprise:
    providing the second computer system with information indicating that the first token is invalid; and
    receiving a notification that an operation request supplied to the second computer system that includes the first token was rejected.

6. The computer readable medium of claim 1, wherein the operations further comprise:
    prior to providing the first token, encoding the first token with a time stamp indicating a time of creation of the first token, wherein the time stamp is usable by the second computer system to determine whether to reject the first token.

7. A method, comprising:
    a security computer system storing permission information for one or more tenants of a database computer system, wherein the one or more tenants includes a particular tenant having a plurality of users;
    the security computer system receiving, from a particular one of the plurality of users, an access request to the database computer system;
    the security computer system authenticating the particular user;
    the security computer system selecting a subset of a full set of permissions for the authenticated particular user;
    the security computer system creating a first token for the particular user that has the selected subset of permissions, wherein the first token is created such that the first token does not exceed a specified size;
    the security computer system providing, to the particular user, the first token;
    the security computer system receiving a permission request to determine whether the particular user is permitted to perform, at the database computer system, an action corresponding to a particular permission not in the subset of permissions included in the first token, wherein the permission request is responsive to an operation request to the database computer system that is associated with the first token;
    the security computer system determining, based on the full set of permissions including the particular permission, to authorize the permission request; and
    the security computer system creating a subsequent, second token having an updated set of permissions selected by replacing one of the subset of permissions used in the first token with the particular permission in response to the subset of permissions having a maximum possible number of permissions for a token.

8. The method of claim 7, wherein the selecting includes:
    the security computer system selecting the subset of the full set of permissions to include in the first token based on which permissions of the full set of permissions have been used most frequently in accessing the database computer system.

* * * * *